US007099354B2

(12) United States Patent
Keating (10) Patent No.: US 7,099,354 B2
(45) Date of Patent: Aug. 29, 2006

(54) METHOD AND APPARATUS FOR FREQUENCY AND TIMING DISTRIBUTION THROUGH A PACKET-BASED NETWORK

(75) Inventor: Pierce V. Keating, Issaquah, WA (US)

(73) Assignee: Radioframe Networks, Inc., Redmond, WA (US)

(*) Notice: Subject to any disclaimer, the term of this patent is extended or adjusted under 35 U.S.C. 154(b) by 1015 days.

(21) Appl. No.: 10/132,086

(22) Filed: Apr. 24, 2002

(65) Prior Publication Data

US 2003/0137997 A1   Jul. 24, 2003

Related U.S. Application Data

(60) Provisional application No. 60/351,921, filed on Jan. 24, 2002.

(51) Int. Cl.
*H04J 3/06* (2006.01)
*G06F 15/15* (2006.01)
*H04L 7/00* (2006.01)

(52) U.S. Cl. ............... 370/519; 709/208; 709/248; 375/358

(58) Field of Classification Search ........... 370/249, 370/519; 375/358
See application file for complete search history.

(56) References Cited

U.S. PATENT DOCUMENTS

| 4,063,220 | A | 12/1977 | Metcalfe et al. | |
|---|---|---|---|---|
| 5,566,180 | A * | 10/1996 | Eidson et al. | 370/473 |
| 6,373,834 | B1 * | 4/2002 | Lundh et al. | 370/350 |
| 6,665,308 | B1 * | 12/2003 | Rakib et al. | 370/441 |
| 6,665,316 | B1 * | 12/2003 | Eidson | 370/509 |
| 6,816,510 | B1 * | 11/2004 | Banerjee | 370/503 |
| 2001/0002196 | A1 * | 5/2001 | Fellman et al. | 370/442 |

OTHER PUBLICATIONS

Cristian, F., "A Probabilistic Approach to Distributed Clock Synchronization," *Proceedings 9th International Conference on Distributed Computing Systems*, IEEE, Newport Beach, California, Jun. 5-9, 1989, pp. 288-296.
Cristian, F., and C. Fetzer, "Probabilistic Internal Clock Synchronization," *Proceedings of the Thirteenth Symposium on Reliable Distributed Systems*, IEEE, Dana Point, California, Oct. 25-27, 1994 (Dec. 6, 1995, version).
Mills, D.L., "Network Time Protocol (Version 3) Specification, Implementation and Analysis," *Network Working Group Report RFC-1305*, University of Delaware, Mar. 1992.

* cited by examiner

*Primary Examiner*—Hassan Kizou
*Assistant Examiner*—Brian Roberts
(74) *Attorney, Agent, or Firm*—Christensen O'Connor Johnson Kindness PLLC (57) ABSTRACT

A reference frequency is distributed through a packet-based network to remote elements in a system. Timing packets are periodically sent from a master timing element, to be received by at least one peripheral timing element. Echo messages are sent to the master timing element by each peripheral timing element after a unique delay, in response to the reception of a timing packet. Loopback delay measurements are included in each timing packet for each peripheral timing element. Each peripheral timing element locks a loop using only timing packets which incur a minimum loopback delay.

20 Claims, 5 Drawing Sheets

Fig.1.

| MAC Address | Source MAC Address | Eth Type |
|---|---|---|
| PE #1 MAC | PE #2 MAC | PE #2 Delay |
| PE #1 Delay | PE #4 MAC | PE #4 Delay |
| PE #3 MAC | PE #6 MAC | PE #6 Delay |
| PE #3 Delay | PE #8 MAC | PE #8 Delay |
| PE #5 MAC | | |
| PE #5 Delay | | |
| PE #7 MAC | | |
| PE #7 Delay | | |
| ... | | |
| CRC | | |

EXAMPLE ETHERNET TIMING PACKET

METHOD AND APPARATUS FOR FREQUENCY AND TIMING DISTRIBUTION THROUGH A PACKET-BASED NETWORK

CROSS-REFERENCE TO RELATED APPLICATION

The benefit of the filing date of provisional application Ser. No. 60/351,921 filed on Jan. 24, 2002 is hereby claimed for this application under 35 U.S.C. § 119(e).

FIELD OF THE INVENTION

This invention relates to the distribution of frequency and timing information over a packet-based network. The invention more particularly relates to apparatus and methods through which highly accurate frequency and phase synchronization can be achieved among various elements within a packet-based network using packets to distribute timing information.

BACKGROUND OF THE INVENTION

For an electronic system which includes several elements interconnected through a packet-based network, such as Ethernet, and in which such elements are required to be closely synchronized in phase and frequency, it is difficult to construct means of synchronization. Many prior systems have required an alternative and substantially dedicated transmission medium, such as separate wires or a separate cable assembly, to transport a synchronization signal to the various system elements. Such prior alternative transmission mediums typically require substantial resources in addition to those of the packet-based network.

It is therefore an object of the present invention to provide a means through which elements of a system, which are interconnected through a packet-based network, can be accurately synchronized in phase and frequency relative to each other and to external references.

SUMMARY OF THE INVENTION

A method and apparatus for frequency distribution through a packet-based network is provided. In accordance with one aspect of the invention, a method is provided for synchronization between a master timing element and at least one peripheral timing element interconnected through a packet-based network. According to the method, a timing packet is periodically transmitted from the master timing element according to a timing reference, where each peripheral timing element is coupled to receive the timing packets. After a timing packet is received by a peripheral timing element, an echo packet is transmitted to the master timing element from the same peripheral timing element. A loopback delay is then measured between the start of the transmission of the timing packet and the reception of a corresponding echo packet for each peripheral timing element. A plurality of loopback delay values corresponding to a peripheral timing element are read over time and the lowest loopback delay value for the peripheral timing element is designated as the nonblocked loopback delay for that peripheral timing element. Then, a loop is locked in each peripheral timing element using only timing packets which incur a nonblocked loopback delay for the corresponding peripheral timing element as a reference.

In accordance with another aspect of the invention, each echo packet is transmitted after a unique delay with respect to each peripheral timing element in order to reduce the likelihood of interblocking delays between echo packets.

In accordance with yet another aspect of the invention, a loop phase from a locked loop of each peripheral timing element is stored when a timing packet is received in each corresponding peripheral timing element. In addition, the loop phase minus the unique delay and minus one half the nonblocked loopback delay is designated as a phase reference for a peripheral timing element if the loop phase corresponds to a timing packet which incurred a nonblocked loopback delay value for the same peripheral timing element.

In accordance with still another aspect of the invention, a synchronous distributed system interconnected by a packet-based network is provided. The system includes a timing reference. Also included is a master timing element coupled to periodically transmit timing packets on the network according to the timing reference. Further included is at least one peripheral timing element coupled to receive the timing packets, each peripheral timing element being coupled to transmit an echo message on the network to the master timing element after a timing packet is received. Also included is a means to determine a loopback delay when each echo message is received by the master timing element, the loopback delay corresponding to each echo message included in a payload field of the following timing packet to be transmitted. Further included is a means to determine a minimum loopback delay corresponding to each peripheral timing element, one half of said minimum loopback delay representative of a nonblocked, network path delay from the master timing element to a peripheral timing element. Also included in each peripheral timing element is a locked loop which is coupled to lock using only timing packets which incur a minimum loopback delay.

In accordance with yet another aspect of the invention, as part of the system each peripheral timing element transmits an echo message after a unique delay.

In accordance with still another aspect of the invention, the system further includes means to designate a phase reference in each locked loop according to the reception of timing packets which incur a minimum loopback delay to a corresponding peripheral timing element minus one half of the minimum loopback delay.

In accordance with yet another aspect of the invention, the system is a distributed radio system, which includes at least one radio interface unit for wireless communication.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
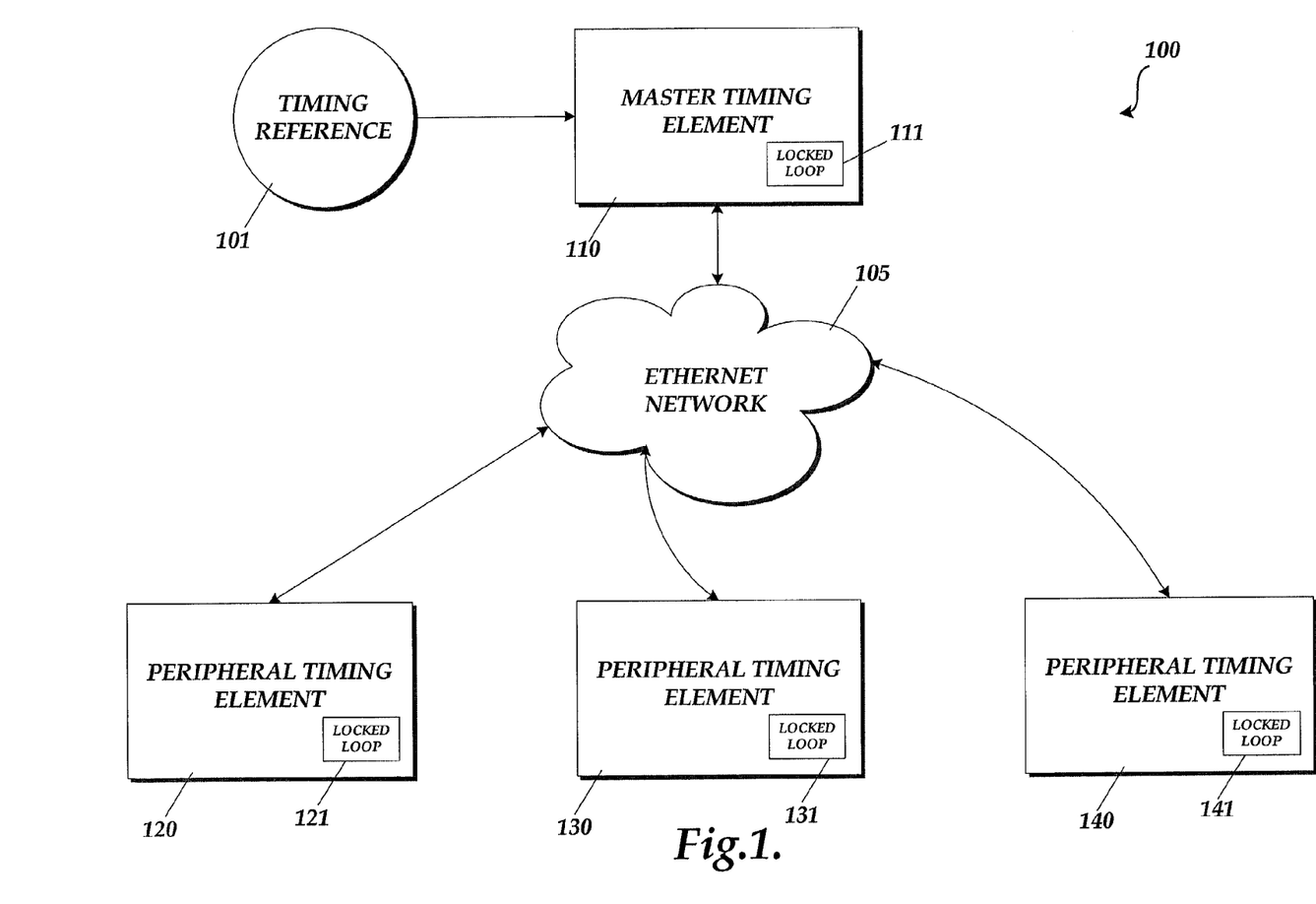
FIG. 1 is a diagram of a distributed electronic system using Ethernet packets for system synchronization.

FIG. 1 is a diagram of a synchronous, frequency-locked distributed system (100) interconnected through a packet-based network. In many prior packet-based networks, an alternative and substantially dedicated transmission medium was required apart from the primary Ethernet network transmission medium in order to transport a synchronization signal to the various system elements. In order to reduce the cost of materials and to simplify the installation of such systems, and to maintain a commonly used Ethernet network interface standard within the system, the present invention interconnects the several elements only through standard Ethernet signaling using a minimum number of industry standard cable assemblies and interfaces to each system element. As will be described in more detail below, the present invention propagates timing and synchronization information to the system elements solely through the use of Ethernet packets.

The present invention addresses the issue of Ethernet packets being difficult to use for the purpose of timing and synchronization. The difficulty comes from the fact that these types of packets are subject to unpredictable constant and stochastic delays through an Ethernet network, which will significantly degrade the degree to which the various system elements can be accurately synchronized. For a time sensitive electronic system, such as a distributed radio system, in which several elements of the radio system are interconnected through an Ethernet network, the unpredictable delays of an Ethernet network interface would generally be intolerable for the purposes of system synchronization. This is particularly true if the synchronization signal is to be used as a time and frequency reference for slot and frame synchronization in a digital radio system or as a frequency reference for the synthesis of radio frequency (RF) carrier signals. As will be described in more detail below, the present invention addresses these issues.

As shown in FIG. 1, the synchronous distributed system (100) of the present invention is interconnected through a packet-based network (105). In general, a packet-based network does not guarantee a particular amount of bandwidth for the transmission of data. Instead, the transmission and reception of data is bursty in nature because elements interfaced to the network are allowed to transmit data at arbitrary, unsynchronized intervals. In operation, the elements of the system (110, 120, 130, and 140) are synchronized to each other in phase and frequency such that various tasks and functions allocated among the system elements (110, 120, 130, and 140) may be selectively executed in a substantially simultaneous manner or may be executed in a precise time sequence, relative to each other and also so that a frequency reference exists within each of the system elements (110, 120, 130, and 140), in which all of the frequency references are substantially frequency-locked. In this discussion, two or more frequencies are considered to be locked when they are related by a constant factor to the other frequencies.

The synchronous frequency-locked distributed system (100) includes one master timing element (110) and one or more peripheral timing elements (120, 130, and 140). In operation, the master timing element (110) transmits timing packets to peripheral timing elements (120, 130, and 140) in a periodic manner in accordance with a timing or frequency reference (101). While the present invention is not constrained to operate with any particular network standard, this discussion will generally refer to an Ethernet (105) as the network medium. However, it is to be understood that other network solutions, such as a wireless LAN, may be used to interconnect the elements of the system (110, 120, 130, and 140) without departing from the scope of the present invention. Preferably, the timing packets are transmitted to the peripheral timing elements (120, 130, and 140) as multicast or broadcast Ethernet packets. A timing packet transmitted from the master timing element (110) will be subject to a particular delay as the packet propagates to each of the peripheral timing elements (120, 130, and 140). The precise propagation delay of a timing packet will depend on the inherent or fixed delays associated with the network equipment with respect to a particular peripheral timing element (120, 130, or 140) and also will depend on the occurrence of "blocking" delays, in which the transmission of a timing packet is temporarily blocked while the transmission of another Ethernet packet is currently in progress. Consequently, the arrival time of a timing packet at any of the peripheral timing elements (120, 130, and 140) may be different and unpredictable.

When a timing packet is received by a particular peripheral timing element (120, 130, or 140), the peripheral timing element will respond with the transmission of an Ethernet echo message to the master timing element (110). Also included in the master timing element (110) is an echo timer (115) used to measure the elapsed time between the start of the transmission of a timing packet from the master timing element (110) and the receipt of an Ethernet echo message from any particular peripheral timing element (120, 130, or 140). The elapsed time described above is hereafter referred to as loopback delay.

Figure 2:
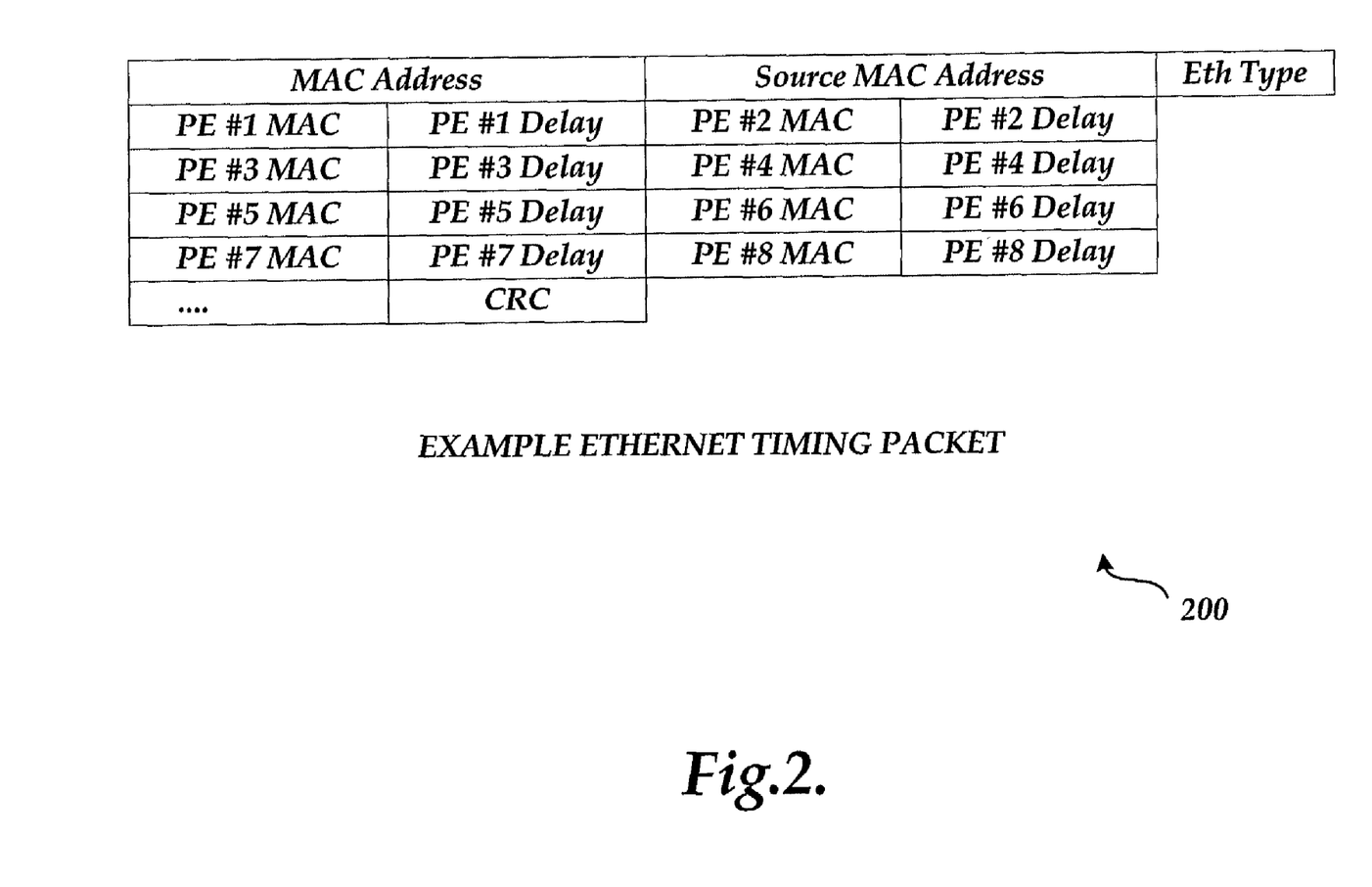
FIG. 2 is a depiction of fields included in a timing packet.

In the preferred embodiment of the present invention, each timing packet transmitted by the master timing element (110) includes one or more loopback delay values associated with the previous timing packet and corresponding echo messages from each peripheral timing element (120, 130, and 140). FIG. 2 illustrates how such information can be organized in a timing packet. The timing packet depicted in FIG. 2 includes a 48 byte destination media access control (MAC) address, a 48 byte source address, a 16 bit Ethernet type field and a 16 bit cyclic redundancy check (CRC) code as defined in the IEEE 803 Ethernet specification. The remaining field of the timing packet shown in FIG. 2 is commonly referred to as the payload. In FIG. 2, the payload includes the measured loopback delays associated with Ethernet echo messages received by the master timing element (110) from the peripheral timing elements (120, 130, and 140). The payload field depicted in FIG. 2 also includes peripheral address fields used to correlate a particular loopback delay value with a particular peripheral timing element (120, 130, and 140). The timing packet can incorporate either a broadcast, multicast, or unicast destination MAC address and can include loopback delay measurements for an arbitrary number of peripheral timing elements in the payload.

In operation, when a peripheral timing element (120, 130, or 140) receives a timing packet, the peripheral timing element (120, 130, or 140) will scan the payload field of the timing packet for a loopback delay measurement, which corresponds to that peripheral timing element (120, 130, or 140). For each timing packet received, a peripheral timing element (120, 130, or 140) will read the corresponding loopback delay measurement corresponding to the same peripheral timing element (120, 130, and 140) and will store the lowest loopback delay value detected over time. After a predetermined number of timing packets has been received by a peripheral timing element (120, 130, or 140), the minimum loopback delay value detected will be designated as twice the fixed or "nonblocked" Ethernet path delay from the master timing element (110) to the peripheral timing element (120, 130, or 140).

Each peripheral timing element (120, 130, and 140) further includes a locked loop (121, 131, and 141), such as a phase-locked loop (PLL) or a frequency-locked loop (FLL), both of which are well known in the art. While a PLL is used as an example in this discussion, it is to be understood that the scope of the present invention includes both a PLL and an FLL. In operation, the locked loop (121, 131, and 141) included in each peripheral timing element (120, 130, and 140 respectively) is phase-locked to timing packets.

Figure 3:
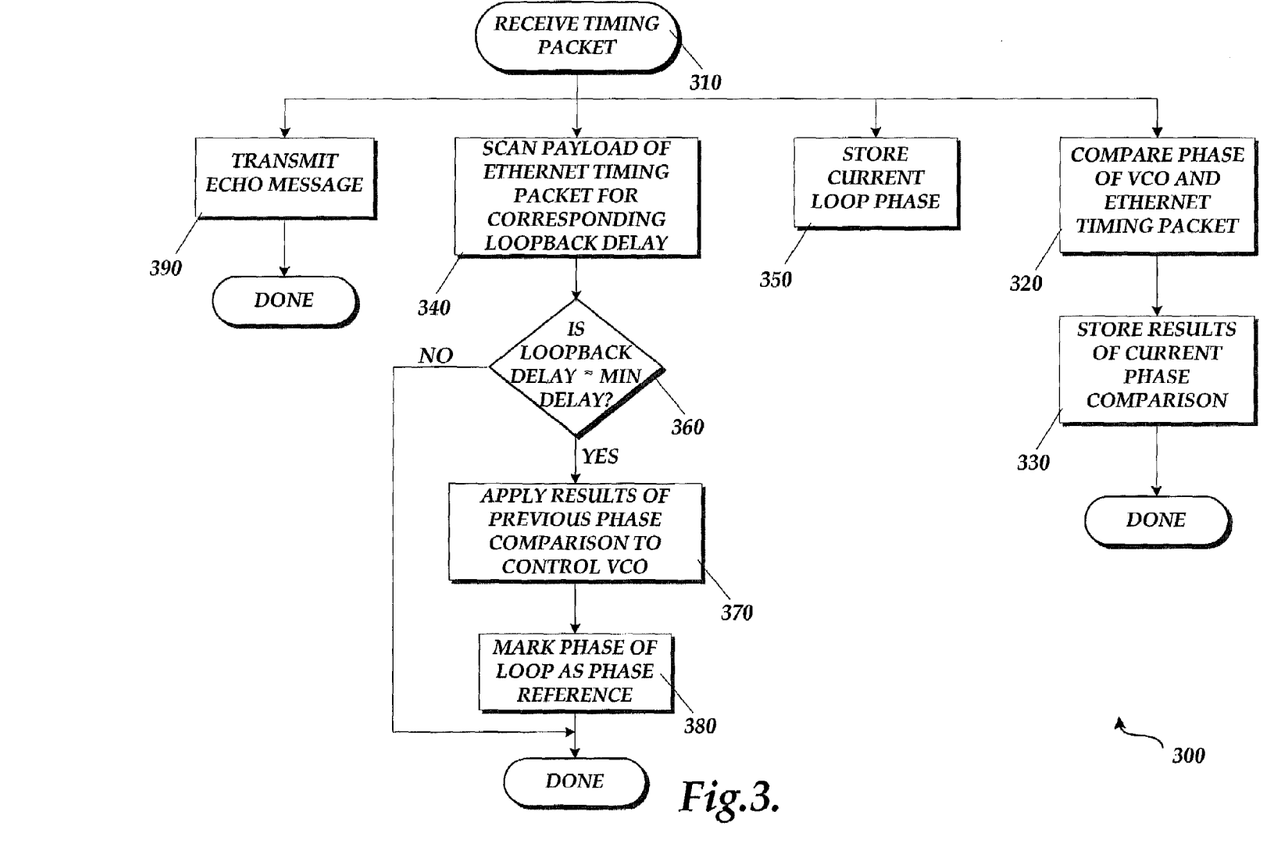
FIG. 3 is a flow chart, which depicts the synchronization method employed within a peripheral timing element.

Each PLL (121, 131, and 141) includes a phase detector and a voltage controlled oscillator (VCO). Operation of each PLL (121, 131, and 141), in conjunction with a timing packet reference, is depicted in the flow chart in FIG. 3. As shown in FIG. 3, block (310) corresponds to an event in which a timing packet is received by a peripheral timing element (120, 130, or 140). After a timing packet is received, the phase detector in the corresponding PLL (121, 131, or 141) will compare the phase of each received timing packet with the phase of the VCO as indicated at block (320), and the peripheral timing element (120, 130, or 140) will examine the payload for a corresponding loopback delay measurement as indicated in block (340) and will transmit an echo message to the master timing element (110) as indicated in block (390). A following step, as indicated at block (330), stores the result of the phase comparison. A decision step, indicated at block (360) checks if the loopback delay is substantially equivalent to the minimum loopback delay. If the loopback delay is substantially equivalent to the minimum loopback delay, then the stored results of the previous phase comparison will be applied to control the frequency of the VCO as required to achieve or retain a locked condition with respect to the timing packet, as depicted at block (370). Using the method depicted in flow chart (300), the PLL included in each peripheral timing element (120, 130, or 140) will be phase-locked only to timing packets which are associated with nonblocked Ethernet path delays, as discerned by the detection of corresponding nonblocked or minimum value loopback delays embedded in the timing packets.

In FIG. 3, the reception of a timing packet triggers the execution of four task flow paths. Preferably the transmit echo message function (390) and the phase comparison function (320) are executed simultaneously when a timing packet is received or are executed after a timing packet is received with respect to predictable and relatively constant delays.

Each PLL or locked loop (121, 131, and 141) has a loop phase. If the PLL (121, 131, or 141) includes a loop divider, then the phase of the loop divider and VCO together represent the loop phase. If the PLL (121, 131, or 141) does not include a loop divider, then the VCO phase alone represents the loop phase. If the PLL (121, 131, or 141) includes a loop divider having a relatively large value, then the phase of the loop divider is a close approximation of the loop phase. Some distributed systems require a phase reference that is substantially constant among the peripheral timing elements (120, 130, and 140). In order to establish a constant phase reference among the peripheral timing elements, the loop phase of each PLL (121, 131, and 141) is selectively marked or designated as a phase reference in conjunction with the arrival of timing packets with a minimum loopback delay. In operation, the current phase of a PLL (121, 131, or 141) is stored when each timing packet is received by a corresponding peripheral timing element (120, 130, or 140) as shown at block (350) in FIG. 3. After a loopback delay value is found in the payload of a timing packet, which corresponds to the receiving peripheral timing element (120, 130, or 140) and which is substantially equal to the nonblocked network path delay, then the previously stored phase value is used to set or designate a phase reference as shown at block (380). For example, if it were desired that a peripheral timing element (120, 130, or 140) have a phase reference that is coincident with the phase of the timing reference (111), then the phase reference would be designated as a previously stored phase value, which corresponds to a timing packet with a minimum loopback delay, minus half the minimum loopback delay. If the PLL is a type 2 control loop, the loop phase will be aligned with arrival of non-blocked timing packets. For this case, the phase reference would be the loop phase minus half the minimum loopback delay. Thus, the synchronization method described above provides an accurate distributed phase reference over a network, which compensates for the arbitrary nonblocked network path delay of the timing packets. Further, each PLL (121, and 141) will maintain the distributed phase reference, in the present blocking delays, due to memory which is inherent in each PLL (121, 131, and 141).

Figure 4:
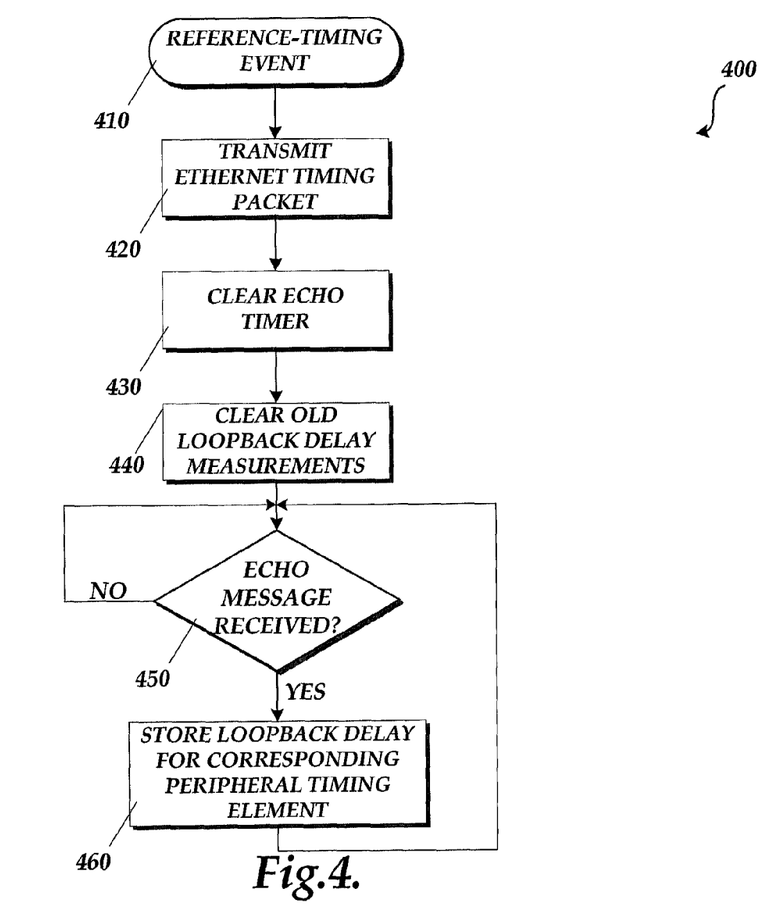
FIG. 4 is a flow chart, which depicts the synchronization method employed within the master timing element.

An example task flow for the transmission of timing packets by a master timing element (110) is shown in FIG. 4. In FIG. 4, the occurrence of a reference-timing event, shown at block (410), triggers the transmission of a timing packet and clears the echo timer and previous loopback delay measurements, shown at blocks (420, 430 and 440) respectively. The master timing element (110) will then look for received echo messages as shown at block (450). As shown at block (460), when an echo message is received from a peripheral timing element (120, 130, or 140), the master timing element (110) will use the current value of the echo timer to calculate a loopback delay, and will store the loopback delay to correspond with the associated peripheral timing element (120, 130, or 140). Each stored loopback delay is included in the payload of the following timing packet transmitted by the master timing element (110).

When a plurality of peripheral timing elements (120, 130, and 140) each receive a timing packet simultaneously, a plurality of echo messages may be transmitted to the master timing element (110) substantially simultaneously. In this condition, some echo messages may incur interblocking delays when received at the master timing element (110) due to the simultaneous arrival of other echo messages. In order to reduce the likelihood of echo messages blocking each other, each peripheral timing element is set to delay the transmission of an echo message, in response to the reception of a timing packet, by a unique time interval. In a preferred embodiment of the present invention, when a peripheral timing element (120, 130, or 140) first receives a timing packet, the peripheral timing element (120, 130, or 140) will immediately transmit an echo message to the master timing element (110). When a peripheral timing element (120, 130, or 140) receives subsequent timing packets, the peripheral timing element (120, 130, or 140) will note the sequence number in which a corresponding loopback delay is positioned within the payload of the timing packet and will delay the transmission of an echo message according to the sequence number. The peripheral timing element (120, 130, and 140) will subtract the added unique delay of the echo message in the corresponding loopback delay when setting the phase reference. Thus, each peripheral timing element (120, 130, and 140) will transmit an echo message, in response to a received timing packet, after a unique interval in time, thereby minimizing the occurrence of blocking delays among the echo messages.

The master timing element (110) includes a delay reference frequency used to measure the loopback delays associated with peripheral elements (120, 130, and 140). In the preferred embodiment, each locked-loop (121, 131, and 141) is configured to generate a local frequency equal to the delay reference frequency. In operation, each timing packet is sent as an Ethernet broadcast or multicast message from the master timing element (110) to the peripheral timing elements (121, 131, and 141 respectively) at a frequency which is lower than and derived from the frequency of the timing reference (101). Alternatively, the master timing element (110) may include a master locked loop (111) used to lock to a timing reference (101) having a relatively low frequency. The master locked loop (111) includes a loop divider in order to multiply the frequency of the timing reference (101) to a relatively higher delay reference frequency. Preferably the transmission of timing packets from the master timing element (110) is triggered from the timing reference (101). When a peripheral timing element (120, 130, or 140) receives a timing packet, the peripheral timing element (120, 130, or 140) sends an echo message to the master timing element (110) after a unique delay, which is derived according to the local frequency in the peripheral timing element (120, 130, or 140). Each timing packet includes a loopback delay value, as measured in accordance with the delay reference frequency in the master timing element (110), corresponding to each echo message received from the peripheral timing elements (120, 130, and 140). When a peripheral timing element (120, 130, or 140) receives a timing packet, it retrieves the associated loopback delay value from the payload and subtracts the respective unique delay value in order to determine the network loopback delay.

Figure 5:
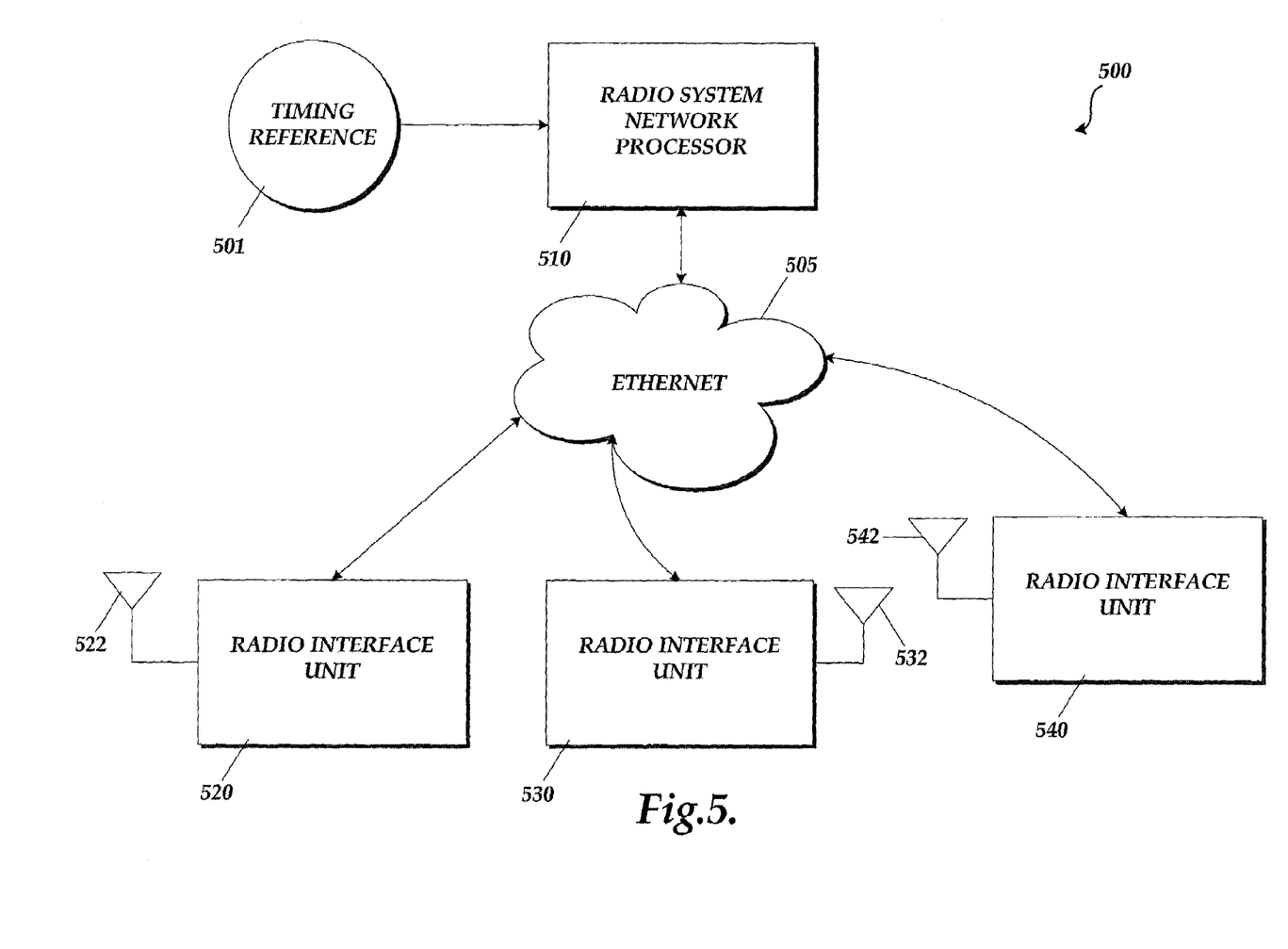
FIG. 5 is a diagram of a distributed radio system using Ethernet packets for system synchronization.

Referring to FIG. 5, a distributed radio system (500) includes multiple system components interconnected through an Ethernet network (505). The distributed radio system (500) includes at least one radio interface unit (520, 530, or 540), which includes means for wireless communication. The radio system network processor (510) is coupled to send control information to the radio interface units (520, 530, and 540) as well as data to be transmitted by the radio interface units (520, 530, and 540) and to accept data received by the radio interface units (520, 530, and 540). In operation, each radio interface unit (520, 530, and 540) generates at least one carrier signal in accordance with the timing reference (501). An accurate estimate of the phase and frequency of the timing reference (501) is generated within each radio interface unit (520, 530, and 540) through the use of Ethernet timing packets transmitted by the radio system network processor (510) using the packet timing synchronization method described above, where the radio system network processor (510) includes equivalent master timing element (110) functionality and where the radio interface units (520, 530, and 540) include equivalent peripheral timing element (120, 130, and 140) functionality. Each radio interface unit (520, 530, and 540) further includes a phase reference, which is synchronized relative to a phase reference within the radio system processor (510) through the use of the Ethernet timing packets using the method described herein.

The present invention enables a plurality of elements, interconnected through a packet-based network, to be accurately synchronized in phase and frequency through the use of periodic timing packets, which are used as a phase and frequency reference for a locked loop. In general, this is accomplished by first measuring a nonblocked loopback path delay and then using only periodic timing packets which incur the nonblocked loopback path delay as a frequency and phase reference. While the preceding description of the present invention has grouped certain functions into either the peripheral timing elements or the master timing element, one skilled in the art will recognize that many other combinations or groupings are possible. Numerous modifications, changes, variations, substitutions, and equivalents will occur to those skilled in the art without departing from the spirit and scope of the present invention as defined by the appended claims.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of frequency and timing distribution between a master timing element and at least one peripheral timing element interconnected through a packet-based network, the method comprising:
   periodically transmitting a timing packet from the master timing element according to a timing reference, each peripheral timing element coupled to receive the timing packets;
   transmitting an echo packet to the master timing element from each peripheral timing element after a timing packet is received by the same peripheral timing element;
   measuring a loopback delay between the start of the transmission of the timing packet and the reception of a corresponding echo packet for each peripheral timing element;
   reading a plurality of loopback delay values corresponding to a peripheral timing element over time and designating the lowest loopback delay value for the peripheral timing element as the nonblocked loopback delay for that peripheral timing element; and
   locking a loop in each peripheral timing element using only timing packets which incur a nonblocked loopback delay for the corresponding peripheral timing element as a reference.

2. The method of claim 1, further comprising:
   transmitting each echo packet after a unique delay with respect to each peripheral timing element in order to reduce the likelihood of interblocking delays between echo packets.

3. The method of claim 2, further comprising:
   storing a loop phase from a locked loop of each peripheral timing element when a timing packet is received in each corresponding peripheral timing element; and
   designating the loop phase minus said unique delay and minus one half the nonblocked loopback delay as a phase reference for a peripheral timing element if the loop phase corresponds to a timing packet which incurred a nonblocked loopback delay value for the same peripheral timing element.

4. A synchronous, frequency-locked distributed system interconnected by a packet-based network comprising:
   a timing reference;
   a master timing element coupled to periodically transmit timing packets on the network according to the timing reference;
   at least one peripheral timing element coupled to receive the timing packets, each peripheral timing element coupled to transmit an echo message on the network to the master timing element after a timing packet is received;

a locked loop included in each peripheral timing element;

wherein a loopback delay is determined according to when each echo message is received by the master timing element, the loopback delay corresponding to each echo message included in a payload field of the following timing packet to be transmitted;

wherein a minimum loopback delay is determined corresponding to each peripheral timing element, one half of said minimum loopback delay being representative of a nonblocked network path delay from the master timing element to a peripheral timing element; and wherein the locked loop in each peripheral timing element is coupled to lock using only timing packets which incur a minimum loopback delay.

5. The synchronous, frequency-locked distributed system of claim 4, wherein each peripheral timing element transmits an echo message after a unique delay.

6. The synchronous, frequency-locked distributed system of claim 5, further comprising:

means to designate a phase reference in each locked loop according to the reception of timing packets which incur a minimum loopback delay to a corresponding peripheral timing element minus one half of the minimum loopback delay.

7. The synchronous, frequency-locked distributed system of claim 6, wherein the system is a distributed radio system, which includes at least one radio interface unit for wireless communication.

8. A method of synchronization between a master timing element and at least one peripheral timing element interconnected through a packet-based network, the method comprising:

periodically transmitting a timing packet from the master timing element according to a timing reference, the at least one peripheral timing element coupled to receive the timing packets;

transmitting an echo packet to the master timing element from the at least one peripheral timing element after a timing packet is received by the at least one peripheral timing element;

measuring a loopback delay related to the timing between the transmission of the timing packet and the reception of the corresponding echo packet from the at least one peripheral timing element;

utilizing a plurality of loopback delay values that are measured over time related to the at least one peripheral timing element to determine a designated loopback delay for the at least one peripheral timing element; and utilizing timing packets which incur the designated loopback delay as a reference for synchronizing the at least one peripheral timing element and the master timing element.

9. The method of claim 8, wherein the designated loopback delay for the at least one peripheral timing element is the minimum loopback delay of the plurality of loopback delays.

10. The method of claim 8, wherein the loopback delays are measured at the master timing element between the transmission of the timing packet and the reception of a corresponding echo packet.

11. The method of claim 8, wherein the at least one peripheral timing element and the master timing element are synchronized by locking a loop in the at least one peripheral timing element using only timing packets which incur the designated loopback delay as a reference.

12. The method of claim 8, wherein the at least one peripheral timing element comprises a plurality of peripheral timing elements, each of the peripheral timing elements transmitting echo packets in response to timing packets from the master timing element, and each of the peripheral timing elements having an associated designated loopback delay.

13. The method of claim 12, further comprising:

transmitting each echo packet after a unique delay with respect to each peripheral timing element in order to reduce the likelihood of interblocking delays between echo packets.

14. The method of claim 13, wherein each peripheral timing element is synchronized with the master timing element by locking a loop in each peripheral timing element using only timing packets which incur the designated loopback delay for the corresponding peripheral timing element as a reference.

15. The method of claim 14, further comprising:

storing a loop phase from a locked loop of each peripheral timing element when a timing packet is received in each corresponding peripheral timing element; and designating the loop phase minus the unique delay and minus one half the designated loopback delay as a phase reference for a peripheral timing element if the loop phase corresponds to a timing packet which incurred a designated loopback delay value for the same peripheral timing element.

16. The method of claim 8, wherein the packet-based network that interconnects the master timing element and the at least one peripheral timing element comprises a wireless LAN.

17. The method of claim 8, wherein the packet-based network that interconnects the master timing element and the at least one peripheral timing element comprises an Ethernet network.

18. A synchronous distributed system interconnected by a packet-based network, the system comprising:

a timing reference;

a master timing element coupled to periodically transmit timing packets on the network according to the timing reference;

at least one peripheral timing element coupled to receive the timing packets, the at least one peripheral timing element coupled to transmit an echo message on the network to the master timing element after a timing packet is received, the at least one peripheral timing element comprising a locked loop; and wherein the master timing element measures the timing between the transmission of the timing packets and the receipt of the echo messages, and determines a designated loopback delay for the at least one peripheral timing element, the locked loop of the at least one peripheral timing element being coupled to lock using only timing packets which incur the designated loopback delay.

19. The system of claim 18, wherein the designated loopback delay is determined according to the minimum loopback delay that is measured by the master timing element.

20. The system of claim 18, wherein the at least one peripheral timing element comprises a plurality of peripheral timing elements, each peripheral timing element transmitting echo messages in response to timing packets received from the master timing element, the timing of the transmission of the echo messages from the peripheral timing elements being coordinated by unique delays for each of the peripheral timing elements such that in response to timing packets that are simultaneously sent to the peripheral timing elements at least some of the echo messages will be transmitted to the master timing element at different times.

\* \* \* \* \*